(12) United States Patent
Chindyasov

(10) Patent No.: US 8,524,130 B2
(45) Date of Patent: Sep. 3, 2013

(54) BIODEGRADABLE DISPOSABLE TABLEWARE AND METHODS FOR MAKING SAME

(76) Inventor: Vadim Chindyasov, Chuvashia Autonomy (RU)

(*) Notice: Subject to any disclaimer, the term of this patent is extended or adjusted under 35 U.S.C. 154(b) by 228 days.

(21) Appl. No.: 13/248,636

(22) Filed: Sep. 29, 2011

(65) Prior Publication Data

US 2013/0081972 A1    Apr. 4, 2013

(51) Int. Cl.
*B29C 67/00* (2006.01)

(52) U.S. Cl.
USPC ............. 264/124; 30/142; 30/322; 30/324; 220/574; 428/35.6

(58) Field of Classification Search
None
See application file for complete search history.

(56) References Cited

U.S. PATENT DOCUMENTS

| | | | | |
|---|---|---|---|---|
| 3,686,384 A | * | 8/1972 | Runton | 264/122 |
| 5,093,051 A | * | 3/1992 | Reiniger | 264/29.4 |
| 5,688,448 A | * | 11/1997 | Shutov et al. | 264/54 |
| 5,756,024 A | * | 5/1998 | Huang | 264/113 |
| 7,121,422 B2 | * | 10/2006 | Gitschlag et al. | 220/575 |
| 7,183,339 B2 | * | 2/2007 | Shen et al. | 524/13 |
| 2006/0102305 A1 | * | 5/2006 | Xu | 162/150 |

* cited by examiner

*Primary Examiner* — Mary F Theisen
(74) *Attorney, Agent, or Firm* — Valery Milgrom, Esq.

(57) ABSTRACT

Biodegradable disposable flatware and utensils manufactured from wood-based or plant-based raw materials, including materials that may be traditionally discarded such as sawdust, plant stalks, seed or grain hulls or the like. The process includes the use of a resin made from the discarded materials to form disposable utensils and flatware.

15 Claims, 2 Drawing Sheets

BIODEGRADABLE DISPOSABLE TABLEWARE AND METHODS FOR MAKING SAME

Embodiments relate generally to disposable tableware, and, more particularly, to biodegradable disposable tableware and methods of forming the same.

Standard disposable plastic tableware and utensils posses a number of drawbacks. These products may have negative environmental impact and provide diminished utility (e.g., lower heat thresholds, the spontaneous isolation of the specific chemical connections from the plastic in the course of time, and the inability to use the articles in microwave ovens). These drawbacks similarly affect plastics derived from bioplastics (e.g., made from corn and similar sources), since they possesses the same deficiencies. Disposable paper articles provide diminished ecological returns and also have diminished thresholds for utility.

Ecologically friendly dinnerware is produced by VerTerra, of Long Island City, N.Y. The VerTerra dinnerware, however, is made in a process that uses fallen leaves as a source material and which production utilizing vapor under the pressure with subsequent heating. The technological process of the manufacture of the articles from VerTerra differs significantly from the process described herein in both the sequence and series of the operations. For example, VerTerra's process initially requires moistening dry leaves by hot vapor, whereas the process of the present disclosure utilizes dry raw material.

The present invention was conceived in light of the above-mentioned drawbacks and limitations, among other things.

An embodiment of an exemplary process in accordance with the instant application includes utilizing a natural bi-product of the wood or plant-based raw material, a resin material, having extremely high threshold of strength and hardness, to make biodegradable disposable flatware, dinnerware and/or utensils.

DETAILED DESCRIPTION

Figure 1:
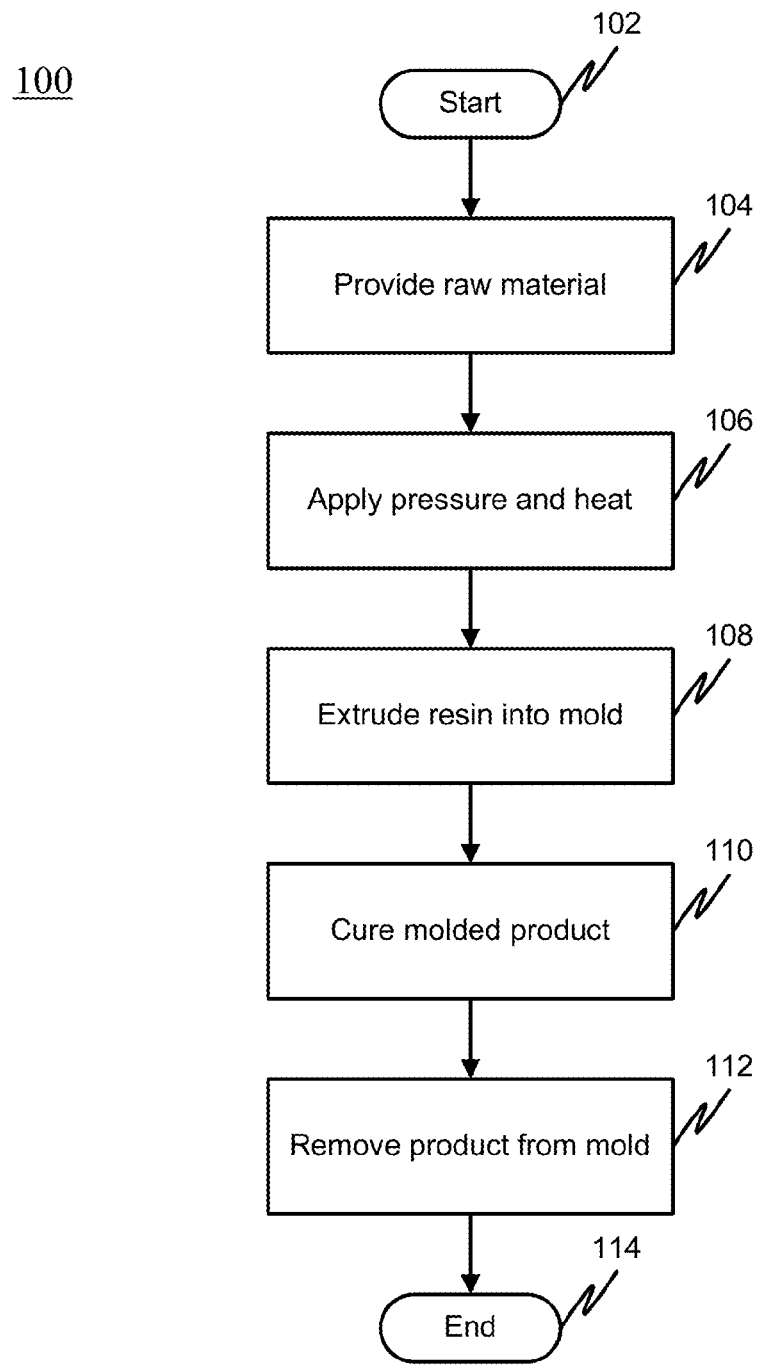
FIG. 1 is a chart showing an exemplary method for making biodegradable dinnerware in accordance with at least one embodiment.

FIG. 1 is a chart showing an exemplary method 100 for making biodegradable dinnerware in accordance with at least one embodiment. In particular, processing begins at 102 and continues to 104.

At 104, raw material is provided. Suitable raw materials include, but are not limited to: wood-based or plant-based refuse or production waste; sawdust and other wood scrap; straw of practically all forms; husk of sunflower seeds or other seed hulls or husks; husk of buckwheat, wheat or other grains; corn stalks and husks; and/or peat. Preferably, the raw material is ground to a sawdust-like level of granularity. Also, the raw material should have moisture content in the range of about 6%-12%, with about 8% being a preferred moisture content level. Optionally the raw materially can be crushed, dried, and/or sifted as needed to achieve the desired raw material properties. Processing continues to 106.

At 106, the raw materials are exposed to an environment of predetermined pressure and heat. For example, suitable pressures can be in the range of about 150-170 MPa. Suitable temperatures can be in the range of about 170-220 degrees Celsius. Processing continues to 108.

At 108, the material is extruded. For example, the extrusion can occur by rigid forming under the pressure. A worm conveyor can be used to feed raw material to a mechanical press (e.g., similar to that shown in FIG. 2), which can be used to develop a pressure on the order of about 150-170 MPa, or a pressure sufficient for sintering of raw material into a solid substance without the addition of binders. The process of sintering can occur continuously at a temperature range of about 170-220 degrees Celsius. The temperature of extrusion is selected by an operator based on the characteristics of source material and is reached both due to the forced preheating of the zone of extrusion and due to the process itself. The resin material is extruded into a mold for a dinnerware or flatware product, including, but not limited to plates, bowls, cups, knives, forks, spoons or the like. It will be appreciated that, as an alternative to extruding into a mold, the resin may simply be extruded, pressed, molded or otherwise formed. Processing continues to 110.

At 110, the molded product is allowed to cure (or harden). A suitable temperature, pressure and time can be selected to allow for sufficient curing before subsequent handling. Once cured, products made from the extruded resin can have a hard outer coating that can be beneficial for dinnerware and utensils in that the products can resist being permeated by liquids. Processing continues to 112.

At 112, the cured product is removed from the mold and is ready for further handling. Processing continues to 114, where processing end. It will be appreciated that 102-114 can be repeated in whole or in part in order to accomplish a contemplated process for making biodegradable disposable dinnerware.

Figure 2:
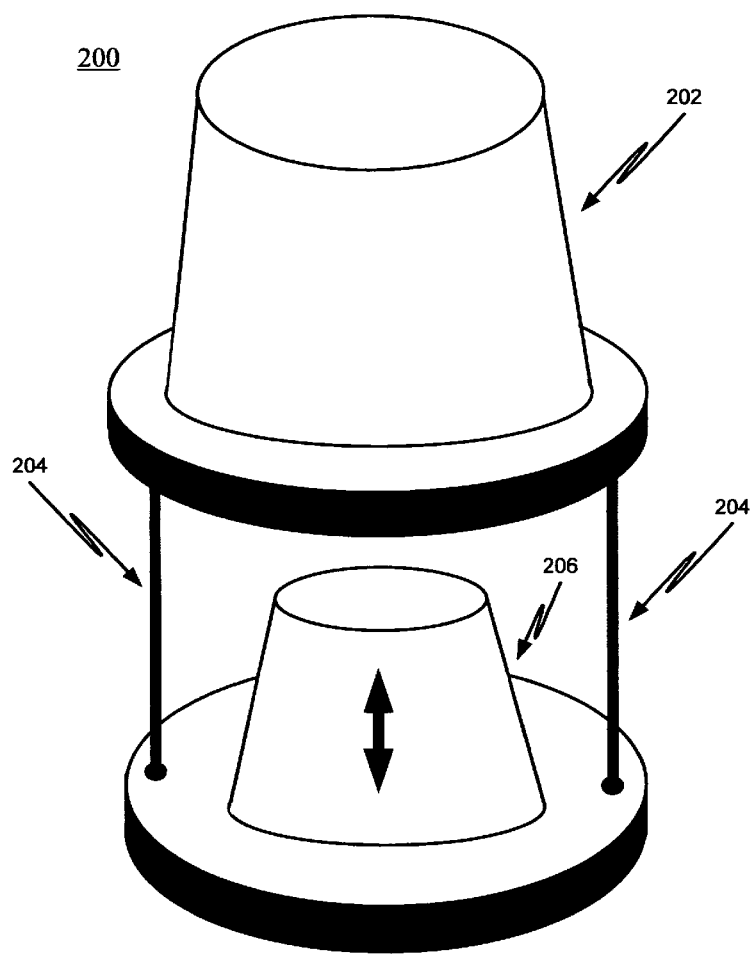
FIG. 2 is a diagram of an exemplary apparatus for making biodegradable dinnerware in accordance with at least one embodiment.

FIG. 2 is a diagram of an exemplary apparatus for making biodegradable dinnerware in accordance with at least one embodiment. In particular a press 200 includes a first die portion 202 for holding a raw material matrix, guides 204 for guiding movement of the press and dies, and a second die element 206 for forming the raw material into the desired product shape.

In operation, the first die element (e.g., negative side) is provided with raw material and then the first die element 202 and the second die element 206 (e.g., positive side) are moved together along the guides 202. A suitable combination of temperature and pressure (as discussed above) are developed to allow for the raw material to sinter and form a resin.

Products formed according to the process described herein may differ significantly from the standard plastic or disposable or recycled paper plates and/or plastic utensils in both composition and utility. In addition, the articles themselves are bacteriologically safe because the process by which they are manufactured can destroy microorganisms that would otherwise be present in or on the originating raw materials.

An embodiment includes a process by which wood-based or plant-based refuse materials are converted into a resin for the production of disposable dishes and utensils primarily for use in the fast food industry. An embodiment can also include the creation and production of disposable flatware and utensils deriving from the final stage of extrusion together with the press which, utilizing additional equipment for molding, will form the shape and sizes of the articles under the above-indicated conditions for process. The process for making dinnerware and utensils described herein may be similar to certain processes used in the production of fuel briquettes.

What is claimed is:

1. A method of making biodegradable articles, the method comprising:

providing plant-based raw materials;
sintering the raw materials at a predetermined pressure and predetermined temperature so as to produce a resin;
extruding the resin into a mold to form a molded article; and
curing the molded article.

2. The method of claim 1, wherein the article is a disposable piece of dinnerware or a disposable utensil.

3. The method of claim 1, wherein the predetermined pressure is in a range of about 150-170 MPa.

4. The method of claim 1, wherein the predetermined temperature is in a range of about 170-220 degree Celsius.

5. A method of making flatware, the method comprising:
providing a wood-based raw material to a mold having a first mold portion;
moving the first mold portion into position adjacent a second mold portion of the mold;
applying a predetermined pressure and a predetermined temperature to the first and second mold portions so as to form the raw materials into flatware;
allowing the flatware to cure; and
moving the first and second mold portions apart to provide for removal of the flatware article from the mold.

6. The method of claim 5, wherein the flatware article is a disposable piece of dinnerware or a disposable utensil.

7. The method of claim 5, wherein the predetermined pressure is in a range of about 150-170 MPa.

8. The method of claim 7, wherein the predetermined temperature is in a range of about 170-220 degree Celsius.

9. The method of claim 5, further comprising sintering the raw material so as to form a resin having a hard coating when cured.

10. A biodegradable disposable dinnerware article formed by a process comprising the steps of:
providing plant-based raw materials;
sintering the raw materials at a predetermined pressure and predetermined temperature so as to produce a resin;
forming the resin into a dinnerware article; and
curing the molded dinnerware article.

11. The dinnerware article of claim 10, wherein the predetermined pressure is in a range of about 150-170 MPa.

12. The dinnerware article of claim 11, wherein the predetermined temperature is in a range of about 170-220 degree Celsius.

13. The dinnerware article of claim 10, wherein the forming includes extruding the resin.

14. The dinnerware article of claim 10, wherein the forming includes injecting the resin into a mold.

15. The dinnerware article of claim 10, wherein the forming includes pressing the resin into a desired shape.

* * * * *